United States Patent
Huo et al.

(10) Patent No.: US 10,509,770 B2
(45) Date of Patent: Dec. 17, 2019

(54) HEURISTIC INTERFACE FOR ENABLING A COMPUTER DEVICE TO UTILIZE DATA PROPERTY-BASED DATA PLACEMENT INSIDE A NONVOLATILE MEMORY DEVICE

(71) Applicant: Samsung Electronics Co., Ltd., Gyeonggi-do (KR)

(72) Inventors: Jianjian Huo, San Jose, CA (US); Changho Choi, San Jose, CA (US); Derrick Tseng, Union City, CA (US); Praveen Krishnamoorthy, Sunnyvale, CA (US); Hingkwan Huen, Daly City, CA (US)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 29 days.

(21) Appl. No.: 15/090,799

(22) Filed: Apr. 5, 2016

(65) Prior Publication Data
US 2017/0017663 A1    Jan. 19, 2017

Related U.S. Application Data

(60) Provisional application No. 62/245,100, filed on Oct. 22, 2015, provisional application No. 62/192,045, filed on Jul. 13, 2015.

(51) Int. Cl.
*G06F 16/17*    (2019.01)
*G06F 16/23*    (2019.01)
(Continued)

(52) U.S. Cl.
CPC .......... *G06F 16/1727* (2019.01); *G06F 3/061* (2013.01); *G06F 3/0619* (2013.01);
(Continued)

(58) Field of Classification Search
CPC ............. G06F 17/30138; G06F 3/0619; G06F 3/0652; G06F 17/30371; G06F 3/0688; G06F 12/0246
See application file for complete search history.

(56) References Cited

U.S. PATENT DOCUMENTS

| 4,641,197 A | 2/1987 | Miyagi |
| 4,827,411 A | 5/1989 | Arrowood |

(Continued)

FOREIGN PATENT DOCUMENTS

| JP | 5723812 | 5/2015 |
| WO | 2012170751 | 12/2012 |

(Continued)

OTHER PUBLICATIONS

"Improving Flash Write Performance by Using Update Frequency," Radu Stoica and Anastasia Ailamaki, The 39th International Conference on Very Large Data Bases, Aug. 26-30, 2013, Riva del Garda, Trento, Italy; Proceedings of the VLDB Endowment, vol. 6, No. 9, Copyright 2013 VLDB.

(Continued)

*Primary Examiner* — Tasnima Matin
(74) *Attorney, Agent, or Firm* — Van Pelt, Yi & James LLP

(57) ABSTRACT

An interface for enabling a computer device to utilize data property-based data placement inside a nonvolatile memory device comprises: executing a software component at an operating system level in the computer device that monitors update statistics of all data item modifications into the nonvolatile memory device, including one or more of update frequencies for each data item, accumulated update and delete frequencies specific to each file type, and an origin of the data item; storing the update statistics of each of the data items and each of the data item types in a database; and intercepting all operations, including create, write, and (Continued)

update, of performed by applications to all the data items, and automatically assigning a data property identifier to each of the data items based on current update statistics in the database, such that the data items and assigned data property identifiers are transmitted over a memory channel to the non-volatile memory device.

38 Claims, 5 Drawing Sheets

(51) Int. Cl.
*G06F 12/02* (2006.01)
*G06F 3/06* (2006.01)

(52) U.S. Cl.
CPC .......... *G06F 3/0643* (2013.01); *G06F 3/0652* (2013.01); *G06F 3/0679* (2013.01); *G06F 3/0688* (2013.01); *G06F 12/0246* (2013.01); *G06F 16/2365* (2019.01)

(56) References Cited

U.S. PATENT DOCUMENTS

| | | | |
|---|---|---|---|
| 6,282,663 | B1 | 8/2001 | Khazam |
| 6,438,555 | B1 | 8/2002 | Orton |
| 6,920,331 | B1 | 7/2005 | Sim |
| 7,660,264 | B1 | 2/2010 | Eiriksson |
| 7,870,128 | B2 | 1/2011 | Jensen |
| 7,970,806 | B2 | 6/2011 | Park et al. |
| 8,112,813 | B1 | 2/2012 | Goodwin |
| 8,312,217 | B2 | 11/2012 | Chang et al. |
| 8,495,035 | B2 | 7/2013 | Aharonov |
| 8,566,513 | B2 | 10/2013 | Yamashita |
| 8,738,882 | B2 | 5/2014 | Post et al. |
| 8,838,877 | B2 | 9/2014 | Wakrat et al. |
| 8,874,835 | B1 | 10/2014 | Davis et al. |
| 9,021,185 | B2 | 4/2015 | Ban |
| 9,042,181 | B2 | 5/2015 | Flynn et al. |
| 9,158,770 | B1 | 10/2015 | Beadles |
| 9,213,633 | B2 | 12/2015 | Canepa et al. |
| 9,330,305 | B2 | 5/2016 | Zhao |
| 9,413,587 | B2 | 8/2016 | Smith |
| 9,575,981 | B2 | 2/2017 | Dorman |
| 9,892,041 | B1 | 2/2018 | Banerjee |
| 2001/0016068 | A1 | 8/2001 | Shibata |
| 2002/0011431 | A1 | 1/2002 | Graef |
| 2002/0032027 | A1 | 3/2002 | Kirani |
| 2002/0059317 | A1 | 5/2002 | Black |
| 2002/0081040 | A1 | 6/2002 | Uchida |
| 2002/0103860 | A1 | 8/2002 | Terada |
| 2003/0055747 | A1 | 3/2003 | Carr |
| 2003/0120952 | A1 | 6/2003 | Tarbotton |
| 2005/0078944 | A1 | 4/2005 | Risan |
| 2005/0165777 | A1 | 7/2005 | Hurst-Hiller |
| 2006/0070030 | A1* | 3/2006 | Laborczfalvi ............. G06F 9/52 717/120 |
| 2006/0168517 | A1 | 7/2006 | Itoh |
| 2006/0242076 | A1 | 10/2006 | Fukae |
| 2007/0050777 | A1 | 3/2007 | Hutchinson |
| 2007/0225962 | A1 | 9/2007 | Brunet |
| 2008/0187345 | A1 | 8/2008 | Sorihashi |
| 2008/0250190 | A1 | 10/2008 | Johnson |
| 2008/0263579 | A1 | 10/2008 | Mears |
| 2009/0323022 | A1 | 12/2009 | Uchida |
| 2010/0030822 | A1 | 2/2010 | Dawson |
| 2010/0146538 | A1 | 6/2010 | Cheong |
| 2010/0288828 | A1 | 11/2010 | Pradhan |
| 2011/0066790 | A1 | 3/2011 | Mogul |
| 2011/0106780 | A1 | 5/2011 | Martinez Heras |
| 2011/0115924 | A1 | 5/2011 | Yu |
| 2011/0145499 | A1 | 6/2011 | Ananthanarayanan |
| 2011/0167221 | A1 | 7/2011 | Pangal |
| 2011/0221864 | A1 | 9/2011 | Filippini |
| 2011/0276539 | A1 | 11/2011 | Thiam |
| 2012/0007952 | A1 | 1/2012 | Otsuka |
| 2012/0042134 | A1 | 2/2012 | Risan |
| 2012/0054447 | A1* | 3/2012 | Swart ................... G06F 12/0888 711/136 |
| 2012/0060013 | A1 | 3/2012 | Mukherjee |
| 2012/0072798 | A1 | 3/2012 | Unesaki et al. |
| 2012/0096217 | A1* | 4/2012 | Son ..................... G06F 12/0246 711/103 |
| 2012/0150917 | A1 | 6/2012 | Sundaram |
| 2012/0158827 | A1 | 6/2012 | Mathews |
| 2012/0191900 | A1 | 7/2012 | Kunimatsu |
| 2012/0254524 | A1 | 10/2012 | Fujimoto |
| 2012/0278532 | A1 | 11/2012 | Bolanowski |
| 2012/0317337 | A1 | 12/2012 | Johar et al. |
| 2013/0019109 | A1 | 1/2013 | Kang |
| 2013/0019310 | A1 | 1/2013 | Ben-Itzhak |
| 2013/0024483 | A1 | 1/2013 | Mohr |
| 2013/0024559 | A1 | 1/2013 | Susanta et al. |
| 2013/0024599 | A1 | 1/2013 | Huang |
| 2013/0050743 | A1 | 2/2013 | Steely |
| 2013/0097207 | A1 | 4/2013 | Sassa |
| 2013/0111336 | A1 | 5/2013 | Dorman |
| 2013/0111547 | A1 | 5/2013 | Kraemer |
| 2013/0159626 | A1 | 6/2013 | Katz et al. |
| 2013/0183951 | A1 | 7/2013 | Chien |
| 2013/0290601 | A1 | 10/2013 | Sablok et al. |
| 2013/0304944 | A1 | 11/2013 | Young |
| 2014/0049628 | A1 | 2/2014 | Motomura |
| 2014/0195921 | A1 | 7/2014 | Grosz |
| 2014/0215129 | A1 | 7/2014 | Kuzmin et al. |
| 2014/0281158 | A1 | 9/2014 | Ravimohan et al. |
| 2014/0281172 | A1 | 9/2014 | Seo |
| 2014/0289492 | A1* | 9/2014 | Ranjith Reddy ..... G06F 3/0613 711/170 |
| 2014/0333790 | A1 | 11/2014 | Wakazono |
| 2015/0026257 | A1 | 1/2015 | Balakrishnan |
| 2015/0074337 | A1 | 3/2015 | Jo |
| 2015/0113652 | A1 | 4/2015 | Ben-Itzhak |
| 2015/0146259 | A1 | 5/2015 | Enomoto |
| 2015/0186648 | A1 | 7/2015 | Lakhotia |
| 2015/0188960 | A1 | 7/2015 | Alhaidar |
| 2016/0048445 | A1 | 2/2016 | Gschwind |
| 2016/0070819 | A1 | 3/2016 | Söderberg |
| 2016/0078245 | A1 | 3/2016 | Amarendran |
| 2016/0094603 | A1 | 3/2016 | Liao |
| 2016/0139838 | A1 | 5/2016 | D'Sa |
| 2016/0179386 | A1 | 6/2016 | Zhang |
| 2016/0196076 | A1 | 7/2016 | Oh |
| 2016/0197950 | A1 | 7/2016 | Tsai |
| 2016/0203197 | A1 | 7/2016 | Rastogi |
| 2016/0219024 | A1 | 7/2016 | Verzun |
| 2016/0239615 | A1 | 8/2016 | Dorn |
| 2016/0266792 | A1 | 9/2016 | Amaki et al. |
| 2016/0283125 | A1 | 9/2016 | Hashimoto et al. |
| 2016/0313943 | A1 | 10/2016 | Hashimoto et al. |
| 2017/0017663 | A1 | 1/2017 | Huo |
| 2017/0039372 | A1 | 2/2017 | Koval |
| 2017/0109096 | A1 | 4/2017 | Jean |
| 2017/0123666 | A1 | 5/2017 | Sinclair |
| 2017/0308772 | A1 | 10/2017 | Li |
| 2017/0339230 | A1 | 11/2017 | Yeom |
| 2018/0012032 | A1 | 1/2018 | Radich |

FOREIGN PATENT DOCUMENTS

| | | |
|---|---|---|
| WO | 2013/012901 | 1/2013 |
| WO | 2015005634 | 1/2015 |
| WO | 2015020811 | 2/2015 |

OTHER PUBLICATIONS

"FlashStream: A Multi-tiered Storage Architecture for Adaptive HTTP Streaming," Moonkyung Ryu, Umakishore Ramachandran, MM 2013, Oct. 21-25, 2013, Barcelona, Spain, ACM 978-1-4503-2404-May 13, 2010, http://dx.doi.org/10.1145/2502081.2502122.
"The Multi-streamed Solid-State Drive," Jeong-Uk Kang; Jeeseok Hyun; Hyumjoo Maeng; Sangyeun Cho, HotStorage '14—6th USEN-

(56) References Cited

OTHER PUBLICATIONS

NIX Workshop on Hot Topics in Storage and File Systems, Jun. 17-18, 2014.
U.S. Appl. No. 15/144,588, filed May 2, 2016.
Extended European Search Report dated Aug. 9, 2016 for EP16172142.
Po-Liang Wu, Yuan-Hao Chang, Tei-wei Kuo, "A File System Aware FTL Design for Flash Memory Storage Systems," EDAA, 978-3-9810801-5-5, Sep. 2009.
Jeong-uk Kang, Jeeseok Hyun, Hyunjoo Maeng, sangyeun Cho, "The Multi-streamed Solid State Drive," Memory Solutions Lab, Memory Division, Samsung Electronics Co., 2014.

* cited by examiner

HEURISTIC INTERFACE FOR ENABLING A COMPUTER DEVICE TO UTILIZE DATA PROPERTY-BASED DATA PLACEMENT INSIDE A NONVOLATILE MEMORY DEVICE

CROSS-REFERENCE TO RELATED APPLICATIONS

This application claims the benefit of provisional Patent Application Ser. No. 62/192,045, filed Jul. 13, 2015, and provisional Patent Application Ser. No. 62/245,100, filed Oct. 22, 2015, both incorporated herein by reference.

BACKGROUND

Flash memory based solid-state drives (SSD) have been used widely in both consumer computers and enterprise servers. There are two main types of flash memory, which are named after the NAND and NOR logic gates. NAND type flash memory may be written and read in blocks, each of which comprises a number of pages.

Since the NAND flash storage cells in SSDs have very unique properties, SSD's normal usages are very inefficient. For example, although it can be randomly read or programmed a byte or a word at a time, NAND flash memory can only be erased a block at a time. To rewrite a single NAND Flash page, the whole erase block (which contains a lot of flash pages) has to be erased first.

Since NAND flash based storage devices (e.g., SSDs) do not allow in-place updating, a garbage collection operation is performed when the available free block count reaches a certain threshold in order to prepare space for subsequent writes. The garbage collection includes reading valid data from one erase block and writing the valid data to another block, while invalid data is not transferred to a new block. It takes a relatively significant amount of time to erase a NAND erase block, and each erase block has a limited number of erase cycles (from about 3K times to 10K times). Thus, garbage collection overhead is one of the biggest speed limiters in the technology class, incurring higher data I/O latency and lower I/O performance.

Therefore, operating systems (OS) and applications, which don't treat hot/cold data differently, and store them together, will see performance degradation over time (compared to OS's and applications that do treat hot and cold data differently), as well as a shorter SSD lifetime as more erase cycles are needed, causing the NAND cells to wear out faster.

SSD vendors and storage technical committees have come up with a new SSD and standard, called "multi-stream SSD," to overcome this issue by providing OSs and applications with interfaces that separately store data with different lifespans called "streams." Streams are host hints that indicate when data writes are associated with one another or have a similar lifetime. That is, a group of individual data writes are a collective stream and each stream is given a stream ID by the OS or an application. For example, "hot" data can be assigned a unique stream ID and the data for that stream ID would be written to the same erase block in the SSD. Because the data within an erase block has a similar lifetime or is associated with one another, there is a greater chance that an entire erase block is freed when data is deleted by a host system, thereby significantly reducing garbage collection overhead because an entire target block would either be valid (and hence no need to erase), or invalid (we can erase, but no need to write). Accordingly, device endurance, and performance should increase.

However, to utilize this new interface, many changes within the applications (including source code) and the OS are required. As a typical computer can have tens or hundreds of software applications installed and running, it's very difficult for all applications, especially for legacy and closed-source applications, to adapt to those changes, in order to use SSDs more efficiently. In addition, multi-stream SSD has limited applicability in that multi-stream SSD is only compatible for use by operating systems and applications.

What is needed is an improved data property based data placement in a storage device, and more particularly, to an autonomous process that enables computer devices to utilize data property based data placement (e.g., multi-stream) solid-state drives.

BRIEF SUMMARY

The example embodiments provide methods and systems for providing an interface for enabling a computer device to utilize data property-based data placement inside a nonvolatile memory device. Aspects of the example embodiments include: executing a software component at an operating system level in the computer device that monitors update statistics of data item modifications into the nonvolatile memory device, including one or more of update frequencies for at least a portion of the data items, accumulated update and delete frequencies specific to each file type, and an origin of the data item; storing the update statistics for the data items and data item types in a database; and intercepting operations, including create, write, and update, of performed by applications to the data items, and automatically assigning a data property identifier to the data items based on current update statistics in the database, such that the data items and assigned data property identifiers are transmitted over a memory channel to the nonvolatile memory device.

The example embodiments further provide a computer device, comprising: a memory; an operating system; and a processor coupled to the memory, the processor executing a software component provided within the operating system, the software component configured to: monitor update statistics of data item modifications into a nonvolatile memory device, including one or more of update frequencies for at least a portion of the data items, accumulated update and delete frequencies specific to each file type, and an origin of the data item; store the update statistics or the data items and data item types in a database; and intercept all operations, including create, write, and update, of performed by applications to the data items, and automatically assign a data property identifier to each of the data items based on current update statistics in the database, such that the data items and assigned data property identifiers are transmitted over a memory channel to the nonvolatile memory device for storage, thereby enabling the computer device to utilize data property-based data placement inside a nonvolatile memory device.

The example embodiments also provide an executable software product stored on a non-transitory computer-readable storage medium containing program instructions for providing an interface for enabling a computer device to utilize data property-based data placement inside a nonvolatile memory device, the program instructions for: executing a software component at an operating system level in the computer device that monitors update statistics of data item modifications into the nonvolatile memory device, including one or more of update frequencies for at least a portion of the data items, accumulated update and delete frequencies specific to each file type, and an origin of the data item; storing, by the software component, the update statistics for the data items and the data item types in a database; and intercepting all operations, including create, write, and update, of performed by applications to the data items, and automatically assigning a data property identifier to each of the data items based on current update statistics in the database, such that the data items and assigned data property identifiers are transmitted over a memory channel to the nonvolatile memory device for storage.

BRIEF DESCRIPTION OF SEVERAL VIEWS OF THE DRAWINGS

These and/or other features and utilities of the present general inventive concept will become apparent and more readily appreciated from the following description of the embodiments, taken in conjunction with the accompanying drawings of which.

DETAILED DESCRIPTION

Figure 1:
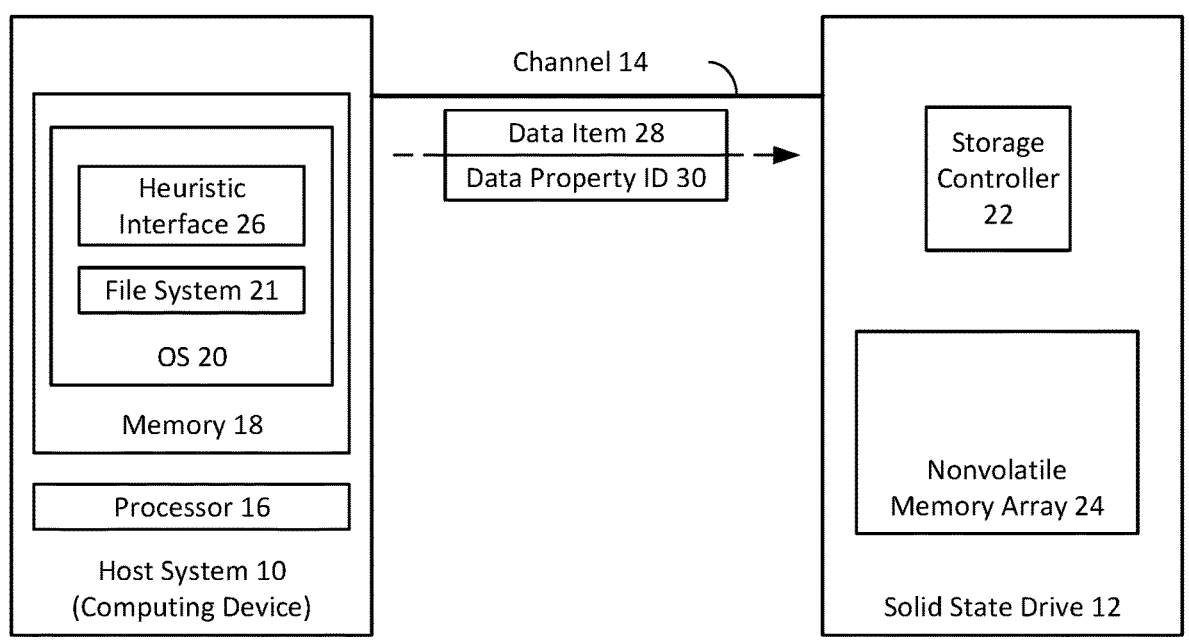
FIG. 1 is a block diagram illustrating an example embodiment of a system for data property-based data placement in a non-volatile memory device provided by a heuristic interface.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

Advantages and features of the present invention and methods of accomplishing the same may be understood more readily by reference to the following detailed description of embodiments and the accompanying drawings. The present general inventive concept may, however, be embodied in many different forms and should not be construed as being limited to the embodiments set forth herein. Rather, these embodiments are provided so that this disclosure will be thorough and complete and will fully convey the concept of the general inventive concept to those skilled in the art, and the present general inventive concept will only be defined by the appended claims. In the drawings, the thickness of layers and regions are exaggerated for clarity.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted.

The term "algorithm" or "module", as used herein, means, but is not limited to, a software or hardware component, such as a field programmable gate array (FPGA) or an application specific integrated circuit (ASIC), which performs certain tasks. An algorithm or module may advantageously be configured to reside in the addressable storage medium and configured to execute on one or more processors. Thus, an algorithm or module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for the components and components or modules may be combined into fewer components or modules or further separated into additional components and components or modules.

Unless defined otherwise, all technical and scientific terms used herein have the same meaning as commonly understood by one of ordinary skill in the art to which this invention belongs. It is noted that the use of any and all examples, or exemplary terms provided herein is intended merely to better illuminate the invention and is not a limitation on the scope of the invention unless otherwise specified. Further, unless defined otherwise, all terms defined in generally used dictionaries may not be overly interpreted.

In one aspect, the example embodiments provide a heuristic and autonomous interface for enabling computer systems to utilize a data property-based data placement method (e.g., multi-streaming) in storage devices, such as SSDs, which does not require changes to applications.

FIG. 1 is a block diagram illustrating an example embodiment of a system for data property-based data placement in a nonvolatile memory device provided by a heuristic interface. The example embodiments described herein may be applicable to any nonvolatile memory device requiring garbage collection, and will be explained with respect to an embodiment where the nonvolatile memory device comprises a solid-state drive (SSD).

The system includes a host system 10 coupled to an SSD 12 over a channel 14. As is well-known, an SSD has no moving parts to store data and does not require constant power to retain that data. Components of the host system 10 that are relevant to this disclosure include a processor 16, which executes computer instructions from a memory 18 including, an operating system (OS) 20 and a file system 21. The host system 10 may include other components (not shown), such as a memory controller for interfacing with the channel 14. The host system 10 and the SSD 12 communicate commands and data items 26 over the channel 14. In one embodiment, the host system may be a typical computer or server running any type of OS. Example types of OSs include single- and multi-user, distributed, templated, embedded, real-time, and library. In another embodiment, the system may be a standalone component, such as a device controller, in which case the OS may comprise a lightweight OS (or parts thereof) or even firmware.

The SSD 12 includes a storage controller 22 and a nonvolatile memory (NVM) array 24 to store data from the host system 10. The storage controller manages 22 the data stored in the NVM array 24 and communicates with the host system over the channel 14 via communication protocols. The NVM array 24 may comprise any type of nonvolatile random-access memory (NVRAM) including flash memory, ferroelectric RAM (F-RAM), magnetoresistive RAM (MRAM), phase-change memory (PCM), millipede memory, and the like. Both the SSD 12 and channel 14 may support multi-channel memory architectures, such as dual channel architecture; and may also support single, double or quad rate data transfers.

According to the example embodiments, in order to reduce garbage collection overhead in the SSD 12, the example embodiments provide an improved data property-based data placement in the SSD. This is accomplished by providing a heuristic interface 26 that enables both applications and hardware components to separately store data items in the SSD 12 that have different lifespans. In addition, in some embodiments, use of a heuristic interface 26 requires no changes to user applications running on the host system 10.

In one embodiment, the heuristic interface 26 comprises at least one software component installed at the operating system level that continuously monitors and stores usage and update statistics of all data items 28, such as files. After an initial warm-up or training period, any create/write/update operation performed on the data items 28 by the host system 10 are assigned a dynamic data property identifier 30 according to current usage and update statistics. In one embodiment, the actual assignment of the data property identifiers 30 may be performed by software hooks in the file system 21 of the OS 20.

Figure 2:
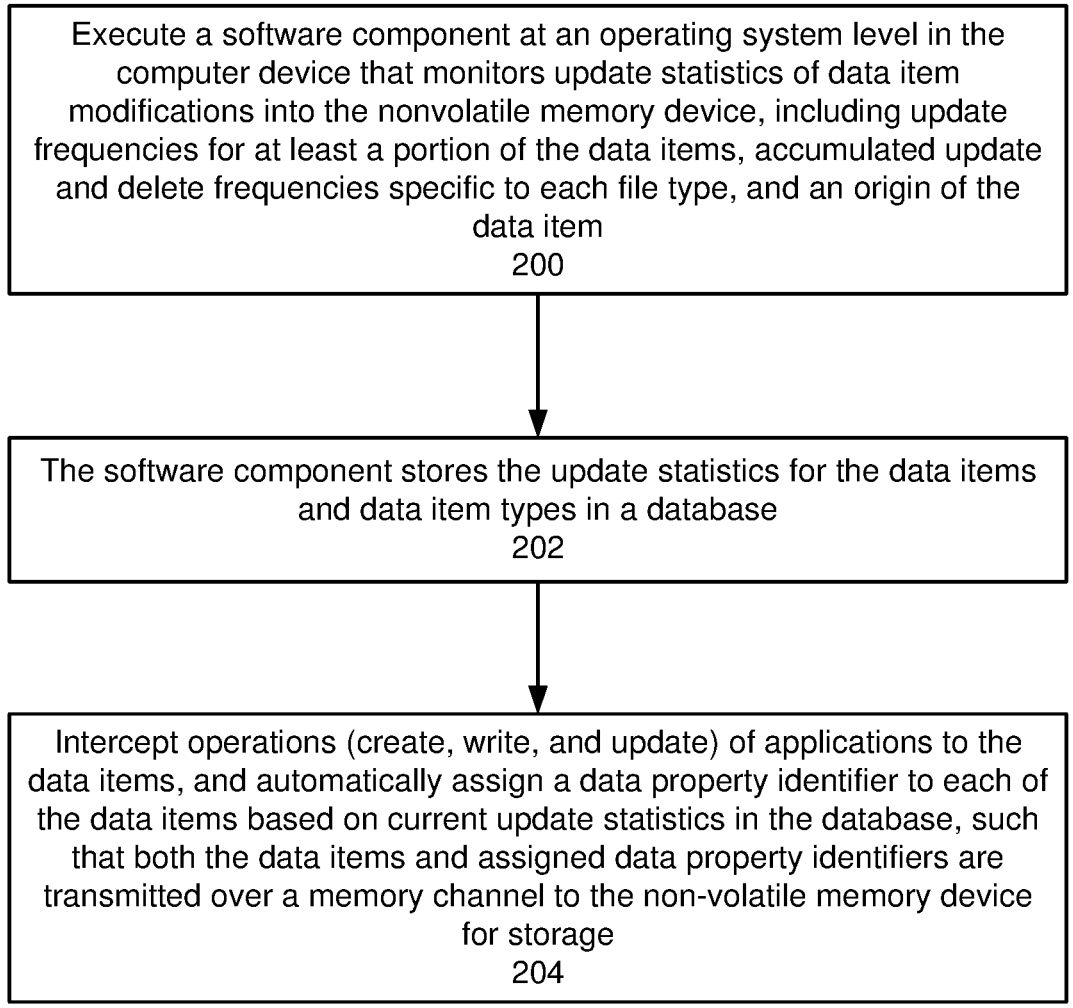
FIG. 2 is a flow diagram illustrating the process performed on the host system for providing a heuristic interface for enabling a computer device to utilize data property-based data placement inside a nonvolatile memory device according to one example embodiment.

FIG. 2 is a flow diagram illustrating the process performed on the host system for providing a heuristic interface for enabling a computer device to utilize data property-based data placement inside a nonvolatile memory device according to one example embodiment. The process may include executing a software component (e.g., the heuristic interface) at an operating system level in the computer device that monitors update statistics of data item (e.g., file) modifications into the nonvolatile memory device, including update frequencies for at least a portion of the data items, accumulated update and delete frequencies specific to each file type, and an origin of the data file (block 200).

The software component stores the update statistics for the data items and data item types in a database (block 202). In one embodiment, the update statistics may be stored both in the host system memory 18 and in the SSD 12.

The software component intercepts most, if not all, operations, including create, write, and update, performed by applications to the data items, and automatically assigns a data property identifier to each of the data items based on current update statistics in the database, such that the data items and assigned property identifiers are transmitted over the memory channel to the nonvolatile memory device for storage (block 204). In one embodiment, the data property identifier acts as a tag, and need not actually transmit any information on what data property the identifier represents.

According to one embodiment, the heuristic interface 26 uses the current update statistics to associate or assign the data property identifiers 30 to each of the data items 28 based on one or more data properties indicating data similarity, such as a data lifetime, a data type, data size, and a physical data source. In a further embodiment, logical block address (LBA) ranges could also be used as a data property indicating data similarity. For example, a pattern of LBA accesses could be an indicator of similarity and call for a grouping of the data. In this manner, data items 28 having the same or similar data properties are assigned the same data property identifier value.

Because the heuristic interface 26 is provided at the operating system level, no changes are required to existing applications in order to make those applications compatible with the data property-based data placement process of the example embodiment. Accordingly, the heuristic interface 26 may be implemented in any type of computing device having a processor and operating system to expand use of conventional multi-streaming beyond applications and operating systems.

Figure 3:
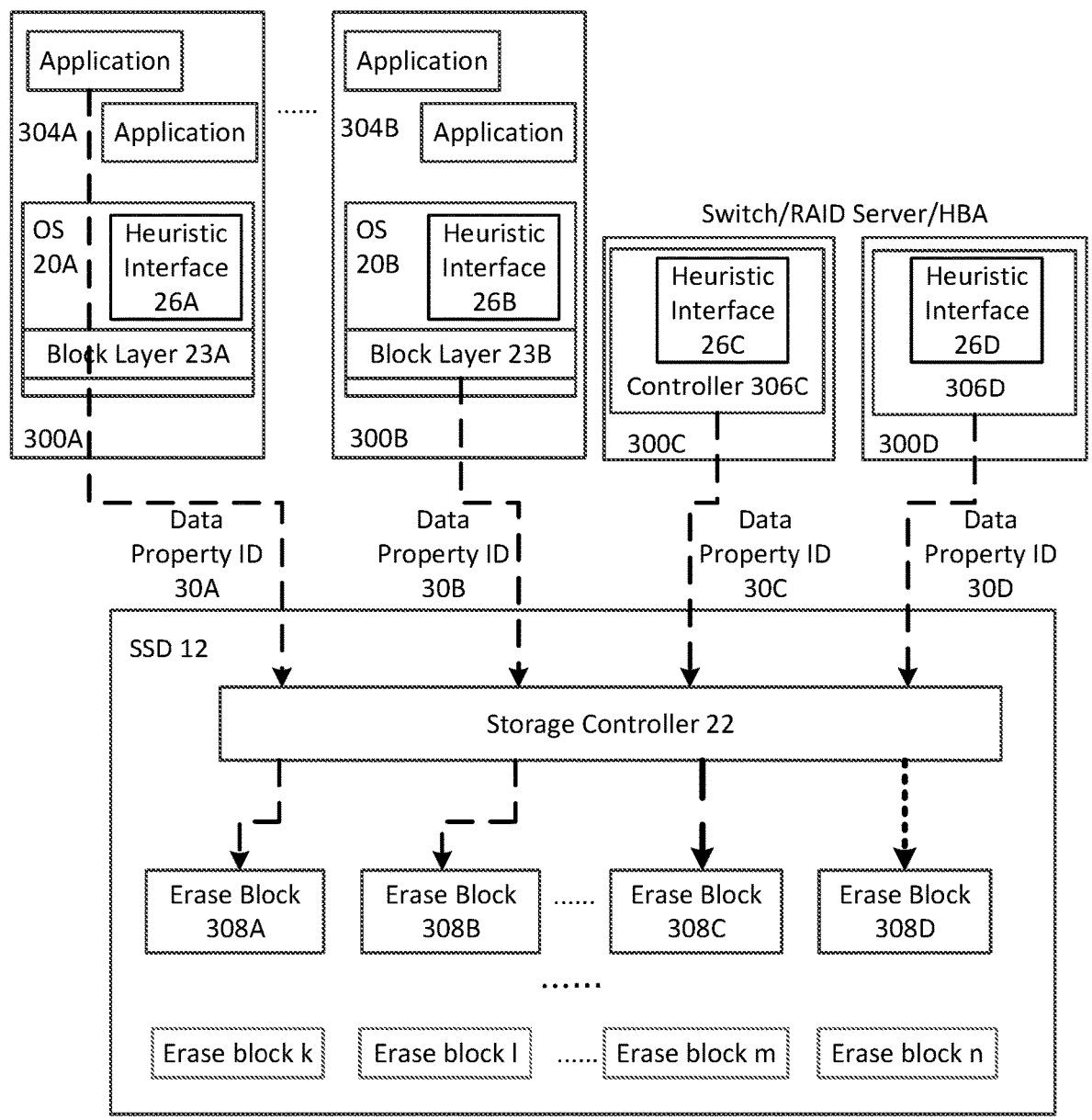
FIG. 3 is a diagram illustrating the heuristic interface of the example embodiments implemented in various types of computing devices, thereby making the computer devices compatible with an SSD having data property-based data placement.

FIG. 3 is a diagram illustrating the heuristic interface of the example embodiments implemented in various types of computing devices 300A-300D, thereby making the computer devices compatible with an SSD 12 having data property-based data placement (e.g., multi-streaming). Computing devices 300A and 300B may represent a host device such as a PC or server or storage subsystem in which respective heuristic interfaces 26A and 26B are provided within operating systems 20A and 20B. The heuristic interface 26A intercepts data item operations performed by an application 304A, and automatically assigns data property identifiers 30A to each of the data items from application 304A based on current update statistics. Similarly, the heuristic interface 26B intercepts data item operations performed by a block layer 23B of the OS 20B, and automatically assigns data property identifiers 30B to each of the data items operated on by the block layer 23B based on current update statistics.

Computing devices 300C and 300D may represent hardware devices, such as a switch, a router, a RAID system, or a host bus adapter (HBA) system, a sensor system or stand-alone device (such as a scanner or camera) in which respective heuristic interfaces 26C and 26D are provided within hardware device controllers 306C and 306D. The heuristic interface 26C intercepts data item operations performed by the device controller 306C, and automatically assigns data property identifiers 30C to each of the data items from the device controller 306C based on current update statistics. Similarly, the heuristic interface 26D intercepts data item operations performed by the device controller 306D, and automatically assigns data property identifiers 30D to each of the data items from the device controller 306D based on current update statistics.

Figure 4:
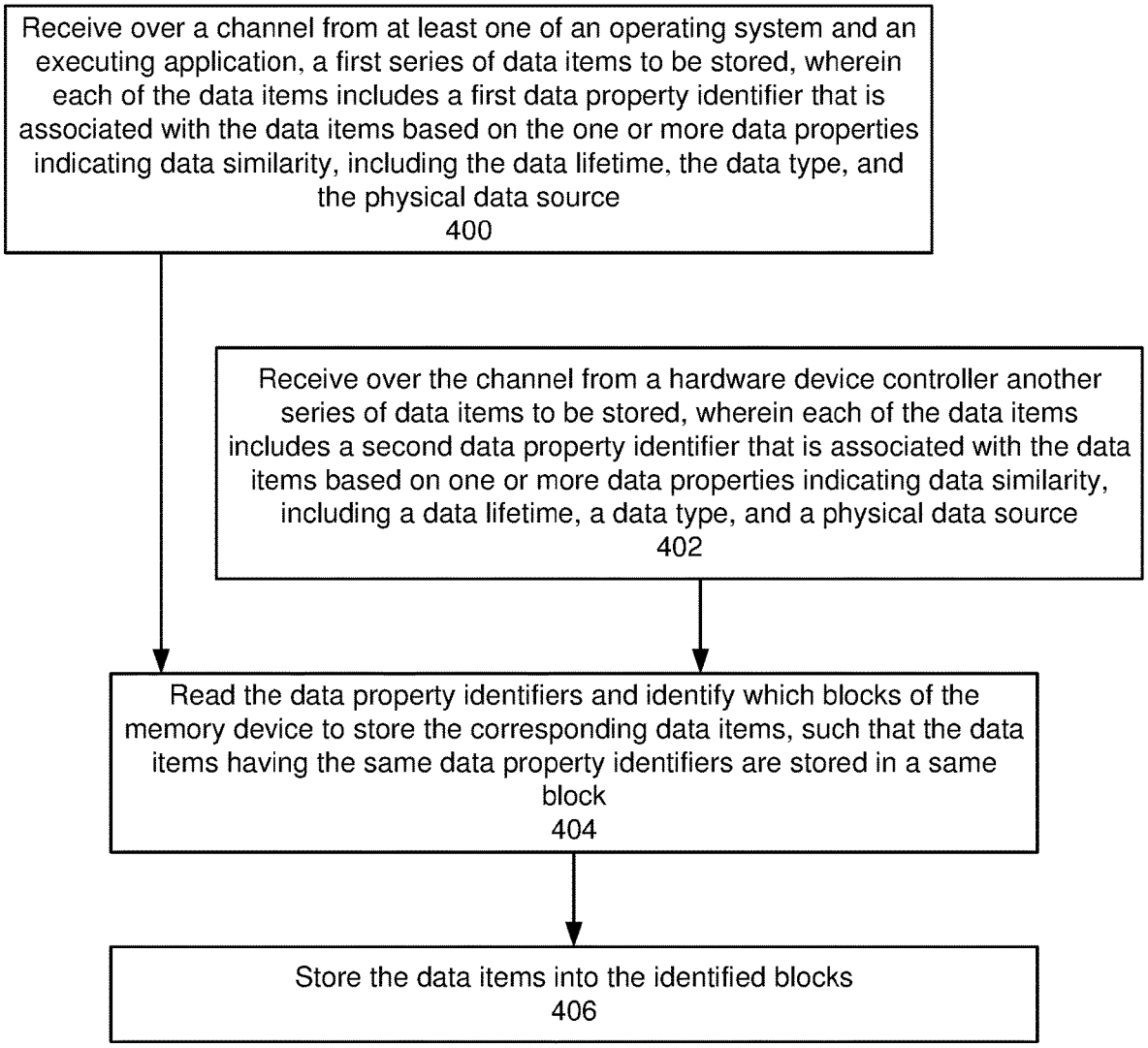
FIG. 4 is a flow diagram illustrating a process for data property-based data placement performed by the storage controller of the nonvolatile memory device according to an example embodiment.

FIG. 4 is a flow diagram illustrating a process for data property-based data placement performed by the storage controller of the nonvolatile memory device according to an example embodiment. Referring to both FIGS. 3 and 4, the process may include receiving over a channel from at least one of an operating system or an executing application (e.g., OS 20B or apps 304A), a first series of data items to be stored, wherein each of the data items includes a first data property identifier that is associated with the data items based on the one or more data properties indicating data similarity, which may include the data lifetime, the data type, data size, and the physical data source (block 400).

In one embodiment, the data type may include properties outside of the application of origin. In a further embodiment, the one or more data properties could also include logical block address (LBA) ranges. It should be noted the data property listed here are not the only types of data properties that can be considered. For example, some other data property, which is currently not known, could be used to assign determine data similarity in the future. In one embodiment, the data items received from the operating system or the application may include data property identifiers that are associated with the data items by another process besides the heuristic interface 26.

The storage controller receives over the channel from a hardware device controller (e.g., controllers 306C and 306D) another series of data items to be stored, wherein each of the data items includes a second data property identifier that is associated with the data items based on one or more of the data properties indicating data similarity, including a data lifetime, a data type, and a physical data source (block 402).

The storage controller reads the data property identifiers and identifies which blocks of the memory device to store the corresponding data items, such that the data items having the same data property identifiers are stored in a same block (block 404), and stores the data items into the identified blocks (block 406).

For example, with respect to FIG. 3, the storage controller 22 of the SSD 12 receives the data items from the computing devices 300A and 300B that have been assigned data property ID 30A and 30B, respectively. The storage controller 22 then stores data items associated with data property ID 30A within the same erase block(s) 308A, and stores data items associated with data property ID 30B within the same erase block(s) 308B. Similarly, the storage controller 22 of the SSD 12 receives the data items from the device controllers 306C and 306D of computing devices 300C and 300D that have been assigned data property ID 30C and 30D, respectively. The storage controller 22 then stores data items associated with data property ID 30C within the same erase block(s) 308C, and stores data items associated with data property ID 30D within the same erase block(s) 308D.

According to the heuristic interface 26 of the example embodiments, a data property ID 30 may be assigned to the data items 28 that are output from any type input device for storage. For example, assume the heuristic interface 28 is implemented within a digital security camera that takes an image periodically, e.g., once a second. The heuristic interface 28 may assign a data property ID 30 to each image file based on data properties indicating data similarity, such as the capture rate of the images, the image file size, and the origin of the images (e.g., device ID and/or GPS location). Note that such data properties need not be associated with a particular application or file system as is the metadata used by conventional multi-streaming.

Figure 5:
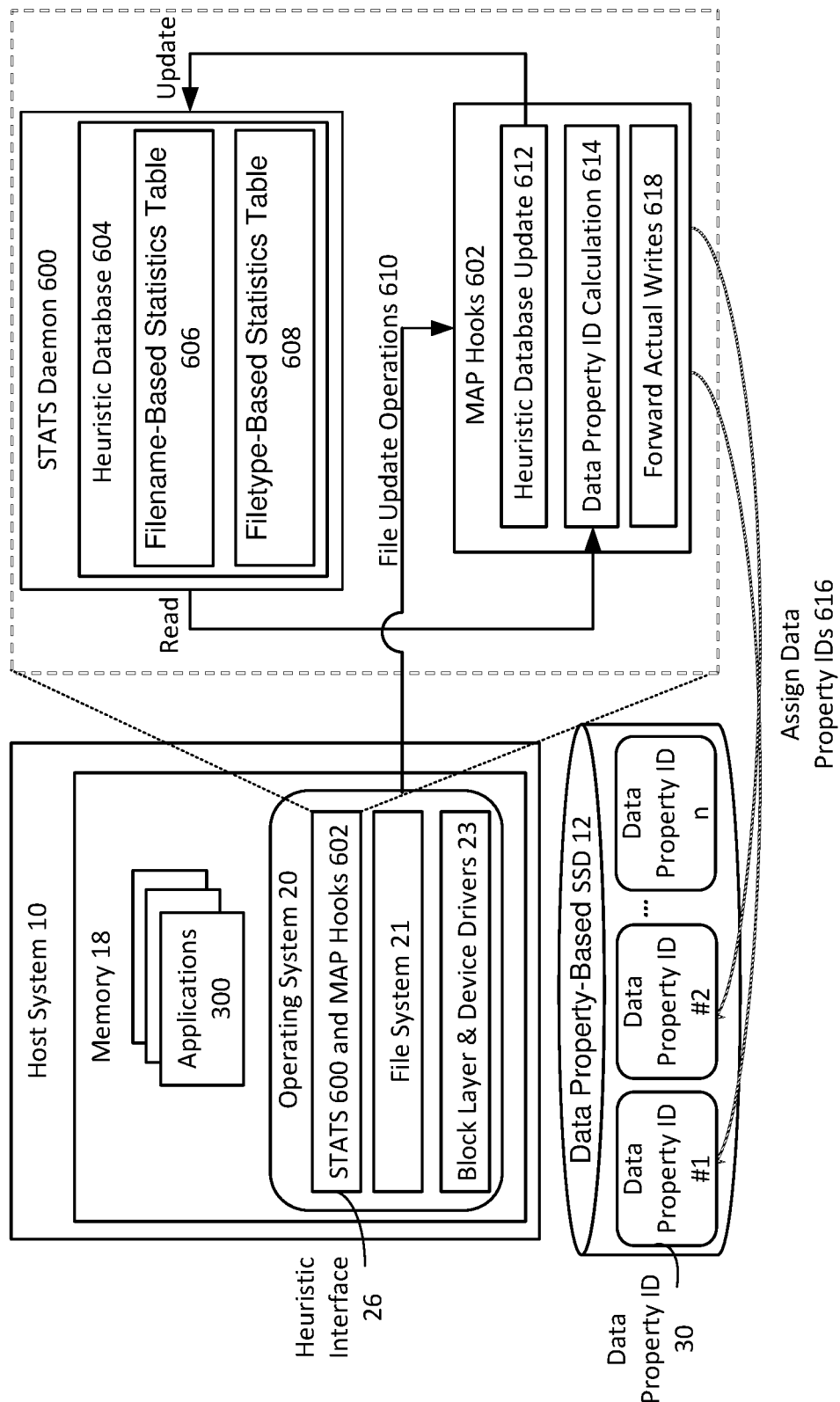
FIG. 5 is a block diagram illustrating an example of the operation of a heuristic interface with respect to storage operations performed by a database application that stores data having different lifetimes and different properties.

FIG. 5 is a block diagram illustrating the heuristic interface, which is one example of an identifier assignment process, in further detail. Similar to FIGS. 1 and 3, the heuristic interface 26 is shown provided at the operating system 20 level of the host system 10. The heuristic interface 26 monitors the operations of the applications 300, the file system 21, and block layer 23 and device drivers, and assigns data property identifiers 30 to data items based on data properties in the update statistics indicating data similarity. The SSD 12 reads the data property identifiers 30 and identifies which blocks of the SSD 12 are used to store the corresponding data items so that the data items having the same data property identifiers 30 are stored in a same block.

According to some example embodiments, the heuristic interface 26 comprises two software components: a stats demon 600 installed within the operating system 20, and map hooks 602 implemented as system call hooks at the file system level. The stats demon 600 may continuously run in the background to manage and maintain at least one heuristic/statistical database 604 of data item modifications to the SSD 12 (shown in the expanded dotted line box). The map hooks 602 may intercept all file update operations and automatically assign a data property ID 30 to each of the file update operations 610 according to current statistics in the database 604.

In one embodiment, the statistics stored in the heuristic database 604 may comprise two types, filename-based statistics and file type-based statistics. The filename-based statistics may record update frequencies (includes rewrite, update, delete, truncate operations) for each data file. The file type-based statistics may record accumulated update and delete frequencies for specific file types. In one embodiment, both sets of statistics are updated by each file update, and may be stored in both memory 18 and on the SSD 12.

In one embodiment, the heuristic database 604 may store the two types of statistics using respective tables, referred to herein as a filename-based statistics table 606 and a file type-based statistics table 608. In one embodiment, the tables may be implemented as hash tables. Each entry in the filename-based statistics table 606 may include a key, which may be a file name, and a value, which may comprise a total number of updates (includes rewrite, update, truncate) for the file during its whole lifetime. Responsive to the creation of a new file, the stats daemon 600 may create a new entry to the filename-based statistics table 606. Responsive to the file being deleted, stats daemon 600 may delete the corresponding entry in filename-based statistics table 606.

Each entry in the file type-based table 608 may include a key, which may be the file type (mp3, mpg, xls and etc.), and a value, which may comprise all total updates (includes rewrite, update, truncate and delete) made to files of this type divided by the number of files of this file type. Responsive to the creation of a new type, the stats daemon 600 may create a new entry in the file type-based statistics table 608, and the stats demon 600 may not delete any entry after the entry is added.

The stats demon 600 also is responsible for loading these two hash tables from SSD 12 to the memory 18 after operating system boot up, and flushes the tables to the SSD periodically for permanent storage. Both hash tables can be stored in the SSD 12 as normal data files.

For a newly installed operating system, the heuristic interface 26 may require a configurable warm-up period to collect sufficient statistics to effectively assign data property identifiers 30.

The map hooks 602 may be implemented as system call hooks at the file system level to intercept all file update operations (create/write/update/delete) 610 made to all files by the applications 300 and the OS 20. Most operating systems, such as Windows and Linux, provide file system hooks for system programming purposes.

Responsive to intercepting file update operations 610, the map hooks 602 may be performed by a heuristic database update operation 612 to send related information to the stats daemon 600. The map hooks 602 then performs a data property ID calculation via block 614 that reads the heuristic database 604, and calculates and assigns a data property identifier 30 for the actual file writes according to current statistics via line 616. File creations or fresh file writes may be assigned data property IDs 30 according to the file's type and current file type statistics; while the file data updates may be assigned data property IDs 30 according to its update frequency and current update frequencies statistics. Finally, the map hooks 602 forwards the actual file writes to the underlying file system 21 via block 618.

The map hooks 602 may use an algorithm based on two statistics hash tables 606 and 608 to calculate and assign data property IDs, below is a simplified example implementation.

The hash table lookup and calculations overhead can be very minimal, thus the SSD read/write throughput won't be affected. More information can be added into these statistics hash tables 606 and 608, and more complicated stream ID calculation algorithms can be used.

In one embodiment, an example simplified data property ID calculation algorithm is a follows:
1. Intercept file creation: add a new entry in the filename-based statistics table; if it's a new type of file, add a new entry in the filetype-based statistics table too.
2. Intercept file read: do nothing.
3. Intercept file delete: delete the file's entry in the filename-based statistics table.
4. Intercept fresh file write:
   If past warm-up period, calculate stream ID as below; otherwise, assign lowest stream ID available.
   Data property ID=floor((Write_Frequency_This_FileType/Max_Write_Frequency_in_FileType_HashTable)×Number_of_Available_Streams_in_NVM_Device)
   Assign stream ID to actual file write and forward it to file system and SSD.
5. Intercept file update:
   Update the filename-based statistics table by increasing the update times in this file's entry.
   Update the filetype-based statistics table by increasing the accumulated write frequency in this file type's entry.
   If past warm-up period, calculate data property ID as below; otherwise, assign lowest data property ID available.
   Data property ID=floor((Total_Writes_This_File/Max_Writes_in_FileName_HashTable)×Number_of_Available_Streams_in_NVM_Device)

As an example of the data property ID calculation, assume the following: a user is editing a photo app to edit a photo file named foo.jpg (a JPEG file type); and the SSD of the user's computer is configured to handle up to four data property IDs or stream IDs. When the user saves the photo onto the SSD 12, the map hooks 602 intercept the file save request, determines the file type and updates the update frequency of that particular file and to the JPEG file type in the heuristic database 604.

The maps hooks 602 also search the current statistics for the write frequency (e.g., per day) for the JPEG file type as well as the maximum write frequency over all file types. In this example, assume that that the JPEG file type has a write frequency per day of 10 and that a ".meta" file type has a write frequency per day of 100, which is the highest or maximum write frequency over all file types. The map hooks 602 may then calculate the data property ID to be assigned to the file save operation using the equation:

Data property ID=floor((Write_Frequency_This_FileType/Max_Write_Frequency_in_FileType_HashTable)×Number_of_Available_Streams_in_NVM_Device)

Data property ID=floor((10/100)*4)+1=1

The data property ID of 1 is then sent with the file data through the file system 21 and block layer 23 to the SSD 12 for storage and block that stores other data having an assigned data property ID of 0.

In an alternative embodiment, the heuristic interface 26 (i.e., the stats demon 600 and the map hooks 602) and assignment of data property IDs based on update statistics in the heuristic database 604, may be implemented within the OS block storage layer 23 or even inside the SSD 12. For both cases, the stats demon 604 only needs to maintain a lookup table to store update statistics for each storage block, and the map hooks 602 may calculate and assign the data property IDs to each block update according to update frequencies stored in the lookup table. In the case of implementation inside the OS block storage layer 23, the map hooks 602 may be implemented in the OS block storage layer instead of the file system 21, the stats demon 604 may be a kernel mode daemon which is part of operating system, and the statistic tables 606 and 608 can be stored in both memory and a specific partition inside SSD 12. In the case of implementation inside a data property-based SSD 12, the statistics tables 606 and 608 can be stored in a NAND flash memory spare area to save storage space, and the in-memory part of the statistics tables 606 and 608 can be stored and merged with current SSD FTL mapping tables.

In one embodiment, the heuristic interface 26 is implemented as a software component. In another embodiment, the heuristic interface 26 could be implemented as a combination of hardware and software. Although the stats demon 600 and the map hooks 602 are shown as separate components, the functionality of each may be combined into a lesser or a greater number of modules/components. For example, in another embodiment, the stats demon 600 and the map hooks 602 may be implemented as one integrated component.

The heuristic interface 26 of the example embodiments may be applied to a broad range of storage markets from client to enterprise, which could be applied to a disk for a single standalone machine (such as desktop, laptop, workstation, server, and the like), storage array, software-define storage (SDS), application-specific storage, virtual machine (VM), virtual desktop infrastructure (VDI), content distribution network (CDN), and the like.

In one embodiment, for example, the NVM array 24 of the SSD 12 may be formed of a plurality of non-volatile memory chips, i.e., a plurality of flash memories. As another example, the NVM array 24 may be formed of different-type nonvolatile memory chips (e.g., PRAM, FRAM, MRAM, etc.) instead of flash memory chips. Alternatively, the array 24 can be formed of volatile memories, i.e., DRAM or SRAM, and may have a hybrid type where two or more types of memories are mixed.

A methods and systems for a heuristic and autonomous interface for enabling computer systems to utilize the data placement method has been disclosed. The present invention has been described in accordance with the embodiments shown, and there could be variations to the embodiments, and any variations would be within the spirit and scope of the present invention. For example, the exemplary embodiment can be implemented using hardware, software, a computer readable medium containing program instructions, or a combination thereof. Software written according to the present invention is to be either stored in some form of computer-readable medium such as a memory, a hard disk, or a CD/DVD-ROM and is to be executed by a processor. Accordingly, many modifications may be made by one of ordinary skill in the art without departing from the spirit and scope of the appended claims.

We claim:

1. A method for providing an interface for enabling a computer device to utilize data property-based data placement inside a nonvolatile memory device, the method comprising:
   executing a software component at an operating system level in the computer device that monitors update statistics of data item modifications into the nonvolatile memory device, including one or more of update frequencies for at least a portion of the data items, accumulated update and delete frequencies specific to each file type, and an origin of* the data item;

storing, by the software component, the update statistics for the data items and data item types in a database; and intercepting all operations, including create, write, and update performed by applications to the data items, and automatically assigning a data property identifier to each of the data items based on current update statistics in the database, such that the data items and assigned data property identifiers are transmitted over a memory channel to the nonvolatile memory device for storage, the software component assigning the data property identifiers to the data items based on one or more data properties indicating data similarity, including at least one of data type, data size, logical block address (LBA) ranges, LBA access patterns, and a physical data source.

2. The method of claim 1, wherein the software component is executed within a device controller of the computer device.

3. The method of claim 1, wherein the software component comprises:

a daemon installed in an operating system of the computer device; and system call hooks implemented at a file system level.

4. The method of claim 3, wherein the daemon continuously runs in the background to manage and maintain at least one database of data item modifications to the nonvolatile memory device.

5. The method of claim 4, wherein the data items comprise files and wherein the statistics stored in the at least one database comprise filename-based statistics and file type-based statistics, wherein the filename-based statistics record update frequencies, including rewrite, update, delete, and truncate operations, for the data items, and wherein the file type-based statistics record accumulated update and delete frequencies specific to the file types.

6. The method of claim 5, wherein at least a portion of the filename-based statistics and file type-based statistics are stored in both memory of the computer device and on the nonvolatile memory.

7. The method of claim 6, wherein the filename-based statistics table and the file type-based statistics table are implemented as hash tables.

8. The method of claim 7, wherein each entry in the filename-based statistics table includes a key and a value, wherein the value comprises a total number of updates for the file during a lifetime of the file.

9. The method of claim 8, wherein responsive to creation of a new file, the daemon creates a new entry in the filename-based statistics table; and responsive to the file being deleted, the daemon deletes the corresponding entry in filename-based table.

10. The method of claim 7, wherein each entry in the file type-based statistics table includes a key and a value, wherein the value comprises all total updates made to files of this type divided by the number of files of this file type.

11. The method of claim 10, wherein responsive to the creation of a new type, the daemon creates a new entry in the file type-based table; and the daemon does not delete any entry after the entry is added.

12. The method of claim 6, wherein the daemon loads the filename-based statistics table and the file type-based statistics table to memory of the compute device after operating system boot up, and flushes the tables to the nonvolatile memory periodically for permanent storage.

13. The method of claim 6, wherein the statistics are stored in the at least one database, and wherein the system call hooks are configured to:

responsive to intercepting file update operations, perform a database update operation to send related information to the daemon;

perform a data property identifier calculation that reads the database and calculates and assigns a data property identifier to actual file writes according to current statistics, wherein file creations or fresh file writes are assigned data property identifiers according to the file's type and current file type statistics; while file data updates are assigned data property identifiers according to its update frequency and current update frequencies statistics; and forward the actual file writes to the file system.

14. The method of claim 13, wherein the nonvolatile memory device is configured to handle a maximum number of streams and wherein the data property identifier calculation responsive to fresh file writes comprises assigning a data property identifier equal to a quantity rounded down to a lowest integer, the quantity being a write frequency for the file type divided by a maximum write frequency from the current file type statistics multiplied by a number of available streams in the nonvolatile memory, the number of available streams being equal to the maximum number of streams minus a current number of streams.

15. The method of claim 13, wherein the nonvolatile memory device is configured to handle a maximum number of streams and wherein the data property identifier calculation responsive to a file update comprises assigning a data property identifier equal to a quantity rounded down to a lowest integer, the quantity being a total number of writes for the file divided by a maximum number of writes for the file from the current file type statistics multiplied by a number of available streams in the nonvolatile memory, the number of available streams being equal to the maximum number of streams minus a current number of streams.

16. The method of claim 3, wherein the system call hooks intercept all file update operations and automatically assign the dynamic property identifiers to each of the file update operations according to current statistics in the database.

17. The method of claim 1, further comprising: responsive to a newly installed operating system, requiring the software component to have a configurable warm-up period to collect sufficient statistics to effectively assign the data property identifiers.

18. The method of claim 1 wherein the nonvolatile memory device utilizes the assigned data property identifiers to select at least one location for storing the data items.

19. A computer device, comprising:

a memory;

an operating system; and a processor coupled to the memory, the processor executing a software component provided within the operating system, the software component configured to:

monitor update statistics of data item modifications into a nonvolatile memory device, including one or more of update frequencies for at least a portion of the data items, accumulated update and delete frequencies specific to each file type, and an origin of the data item;

store the update statistics or the data items and data item types in a database; and intercept all operations, including create, write, and update performed by applications to the data items, and automatically assign a data property identifier to each of the data items based on current update statistics in the database, such that the data items and assigned data property identifiers are transmitted over a memory channel to the nonvolatile memory device for storage, the software component assigning the data property identifiers to the data items based on one or more data properties indicating data similarity, including at least one of data type, data size, logical block address (LBA) ranges, LBA access patterns, and a physical data source.

20. The computer device of claim 19, wherein the software component is executed within a device controller of the computer device.

21. The computer device of claim 19, wherein the software component comprises:
a daemon installed in an operating system of the computer device; and
system call hooks implemented at a file system level.

22. The computer device of claim 21, wherein the daemon continuously runs in the background to manage and maintain at least one database of data item modifications to the nonvolatile memory device.

23. The computer device of claim 22, wherein the data items comprise files and wherein the statistics stored in the at least one database comprise filename-based statistics and file type-based statistics, wherein the filename-based statistics record update frequencies, including rewrite, update, delete, and truncate operations, for the data items, and wherein the file type-based statistics record accumulated update and delete frequencies specific to the file types.

24. The computer device of claim 23, wherein at least a portion of the filename-based statistics and file type-based statistics are stored in both memory of the computer device and on the nonvolatile memory.

25. The computer device of claim 24, wherein the filename-based statistics table and the file type-based statistics table are implemented as hash tables.

26. The computer device of claim 25, wherein each entry in the filename-based statistics table includes a key and a value, wherein the value comprises a total number of updates for the file during a lifetime of the file.

27. The computer device of claim 26, wherein responsive to creation of a new file, the daemon creates a new entry in the filename-based statistics table; and responsive to the file being deleted, the daemon deletes the corresponding entry in filename-based table.

28. The computer device of claim 25, wherein each entry in the file type-based statistics table includes a key and a value, wherein the value comprises all total updates made to files of this type divided by the number of files of this file type.

29. The computer device of claim 28, wherein responsive to the creation of a new type, the daemon creates a new entry in the file type-based table; and the daemon does not delete any entry after the entry is added.

30. The computer device of claim 24, wherein the daemon loads the filename-based statistics table and the file type-based statistics table to memory of the compute device after operating system boot up, and flushes the tables to the nonvolatile memory periodically for permanent storage.

31. The computer device of claim 24, wherein the statistics are stored in the at least one database, and wherein the system call hooks are configured to:

responsive to intercepting file update operations, perform a database update operation to send related information to the daemon;
perform a data property identifier calculation that reads the database and calculates and assigns a data property identifier to actual file writes according to current statistics,
wherein file creations or fresh file writes are assigned data property identifiers according to the file's type and current file type statistics; while file data updates are assigned data property identifiers according to its update frequency and current update frequencies statistics; and
forward the actual file writes to the file system.

32. The computer device of claim 31, wherein the nonvolatile memory device is configured to handle a maximum number of streams and wherein the data property identifier calculation responsive to fresh file writes comprises: assigning a data property identifier equal to a quantity rounded down to a lowest integer, the quantity being a write frequency for the file type divided by a maximum write frequency from the current file type statistics multiplied by a number of available streams for the nonvolatile memory, the number of available streams being equal to the maximum number of streams minus a current number of streams.

33. The computer device of claim 31, wherein the nonvolatile memory device is configured to handle a maximum number of streams and wherein the data property identifier calculation responsive to a file update comprises assigning a data property identifier equal to a quantity rounded down to a lowest integer, the quantity being a total number of writes for the file divided by a maximum number of writes for the file from the current file type statistics multiplied by a number of available streams in the nonvolatile memory, the number of available streams being equal to the maximum number of streams minus a current number of streams.

34. The computer device of claim 21, wherein the system call hooks intercept all file update operations and automatically assign the dynamic property identifiers to each of the file update operations according to current statistics in the database.

35. The computer device of claim 19, further comprising: responsive to a newly installed operating system, requiring the software component to have a configurable warm-up period to collect sufficient statistics to effectively assign the data property identifiers.

36. The computer device of claim 19 wherein the nonvolatile memory device utilizes the assigned data property identifiers to select at least one location for storing the data items.

37. An executable software product stored on a non-transitory computer-readable storage medium containing program instructions for providing an interface for enabling a computer device to utilize data property-based data placement inside a nonvolatile memory device, the program instructions for:
executing a software component at an operating system level in the computer device that monitors update statistics of data item modifications into the nonvolatile memory device, including one or more of update frequencies for at least a portion of the data items, accumulated update and delete frequencies specific to each file type, and an origin of the data item;
storing, by the software component, the update statistics for the data items and the data item types in a database; and intercepting all operations, including create, write, and update performed by applications to the data items, and automatically assigning a data property identifier to each of the data items based on current update statistics in the database, such that the data items and assigned data property identifiers are transmitted over a memory channel to the nonvolatile memory device for storage the software component assigning the data property identifiers to the data items based on one or more data properties indicating data similarity, including at least one of data type, data size, logical block address (LBA) ranges, LBA access patterns, and a physical data source.

38. The executable software product of claim 37 wherein the nonvolatile memory device utilizes the assigned data property identifiers to select at least one location for storing the data items.

* * * * *